April 21, 1959 E. W. VAN WINKLE 2,883,613

MAGNETIC AMPLIFIER

Filed Sept. 23, 1954 4 Sheets-Sheet 1

INVENTOR.
EDGAR W. VAN WINKLE
BY
ATTORNEY

CONTROL WINDINGS IN SERIES AIDING

CONTROL WINDINGS IN PARALLEL SERIES

CONTROL WINDINGS IN PARALLEL

REVERSIBLE POLARITY

INVENTOR.
EDGAR W. VAN WINKLE
BY [signature]
ATTORNEY

April 21, 1959

E. W. VAN WINKLE 2,883,613

MAGNETIC AMPLIFIER

Filed Sept. 23, 1954

4 Sheets-Sheet 3

INVENTOR.
EDGAR W. VAN WINKLE
BY
[signature]
ATTORNEY

April 21, 1959 E. W. VAN WINKLE 2,883,613

MAGNETIC AMPLIFIER

Filed Sept. 23, 1954 4 Sheets-Sheet 4

INVENTOR.
EDGAR W. VAN WINKLE
BY Herbert Smith
ATTORNEY

United States Patent Office 2,883,613

Patented Apr. 21, 1959

2,883,613

MAGNETIC AMPLIFIER

Edgar W. Van Winkle, Rutherford, N.J., assignor to Bendix Aviation Corporation, Teterboro, N.J., a corporation of Delaware Application September 23, 1954, Serial No. 457,887

3 Claims. (Cl. 323—89)

This invention pertains to improvements in magnetic amplifiers and more particularly to a novel magnetic amplifier means for providing high gain with good frequency response.

Heretofore, servo systems employing magnetic amplifier means in lieu of electronic amplifier means, have in general been unable to provide high gain with good frequency response and with low harmonic content in the output waveform. Further, some amplifiers may have certain desirable characteristics having a full wave, but they are not phase reversible. Devices of the kind desired having high gain and good frequency response characteristics were not suitable for mass production and were subject to costly testing and adjustment procedures.

The present invention obviates the aforementioned undesirable features, and it is an object of the present invention to provide novel magnetic amplifier type means which provides high gain with good frequency response.

Another object of the invention is to provide a novel magnetic amplifier usable in a servo system which amplifier is alternating current controlled and which has a low time constant.

A further object of the invention is to provide novel magnetic amplifier means, usable in a servo system, having output with improved frequency response characteristics that is stable in operation.

Another object is to provide an amplifier having a demodulator, a direct current magnetic amplifier stage and an alternating current magnetic amplifier stage.

Another object it is to provide a position servo magnetic amplifier having low harmonic content with high gain suitable for operating a servomotor.

A further object of the invention is to provide a magnetic amplifier having alternating current input and an amplified alternating current output employing a plurality of stages electrically arranged in cascade.

Still another object of the invention is to provide novel magnetic amplifier means which are readily adaptable for mass production, are stable in operation, and extremely robust.

Further, the invention contemplates the use of an alternating current magnetic amplifier consisting of several stages of amplification with each stage including a plurality of elements, each having a control winding, a power winding, and a core of highly permeable magnetic material for providing high gain.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

In the drawings:

Fig. 1 is a representative block diagram showing the present invention employed in an earth inductor compass system.

Figure 2 is a schematic wiring diagram of blocks 34, 35 and 36 of amplifier 26 and certain other components shown in Fig. 1.

Figure 7A:
Figure 8:
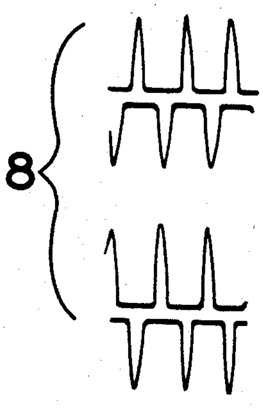
Figure 9:
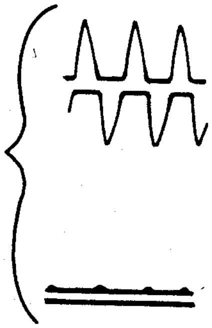
Figure 7:

Figs. 7 and 7A show the input signal at two different times, and wherein Fig. 7 produces an output voltage from the power windings of cores 84, 85, 86, and 87 as shown by the four waveforms of Fig. 8, and wherein Fig. 7A produces an output voltage from the power windings of cores 84, 85, 86, and 87 as shown by the four waveforms of Fig. 9.

Fig. 8 shows the four waveforms which result from the waveform of Fig. 7, the top two waveforms of Fig. 8 represent load voltages produced by cores 84 and 85, in that order, and the bottom two waveforms represent load voltages produced from cores 87 and 86, in that order, reading from top to bottom in Fig. 8.

Fig. 9 shows the four waveforms which result from the waveform of Fig. 7A, the top two waveforms of Fig. 9 represent load voltages produced by cores 84 and 85, in that order, and the bottom two waveforms represent load voltages produced from cores 87 and 86, in that order, reading the waveforms from top to bottom in Fig. 9.

Figure 10A:
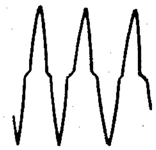
Figure 10:

Fig. 10 represents the vector sum of the four voltages as presented in Fig. 8.

Fig. 10A represents the vector sum of the four voltages as presented in Fig. 9.

Figure 3:
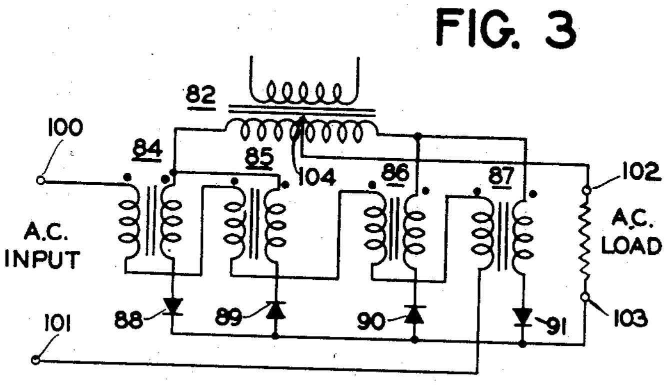
Fig. 3 is a schematic diagram of the alternating current controlled magnetic amplifier with the control windings connected in series aiding.
Figure 11:

Fig. 11 shows the input control voltage across the control winding such as at terminals 100 and 101 of Fig. 3.

Figure 11A:

Fig. 11A shows the simultaneous current in the control windings which are all in series in Fig. 3.

Figure 12:
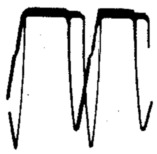

Fig. 12 is a composite view showing the waveforms in element 85 that result from the control voltages illustrated by Figs. 7 and 7A.

Figure 13:
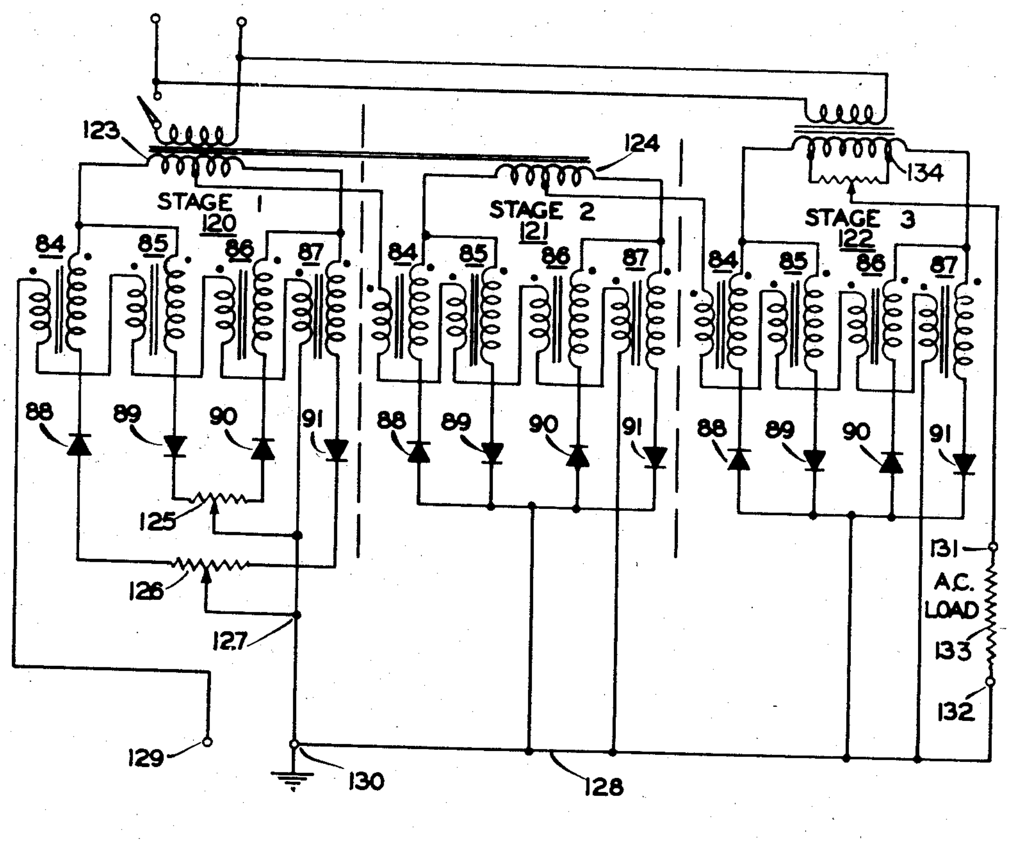

Fig. 13 shows a schematic wiring diagram of a three-stage full wave suppressed carrier magnetic amplifier.

Figure 1:
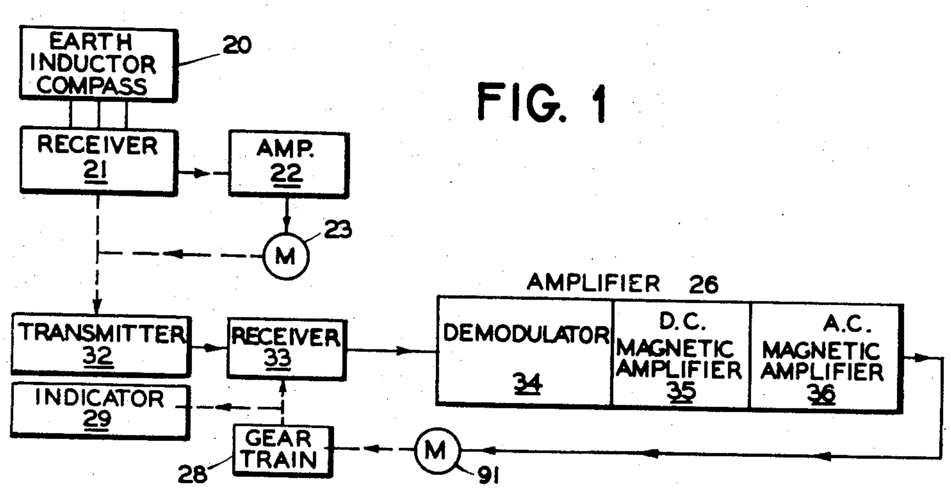

Referring to the drawings, and more particularly to Fig. 1, there is shown an earth inductor compass 20, in response to a magnetic heading as measured from the earth's magnetic field, develops a corresponding signal which is applied to a conventional two-part inductive receiver device 21. When one part of the receiver is not in a null position with respect to the signal held at the other part, the control effect representing the error is applied through amplifier 22 to drive motor 23, which moves the other part of the receiver to a null position. At the same time, the motor 23 drives the rotor of a conventional inductive transmitting device 32, which is connected with a conventional inductive receiver device 33, to form a transmitter-receiver combination. As a result of this movement the rotors of the transmitter and receiver are not in positional agreement. This error signal caused by this disagreement is applied to the three-stage amplifier 26 which develops an output to energize motor 91. Through a gear train 28, motor 91 drives the rotor of receiver 33 so that the two rotors of inductive device 32 and 33 are again in positional agreement, the motor 91 also driving an indicator 29 to show the magnetic heading. The amplifier 26 has three stages, namely, a demodulator 34, a direct current magnetic amplifier 35, and an alternating current magnetic amplifier 36.

Figure 2:
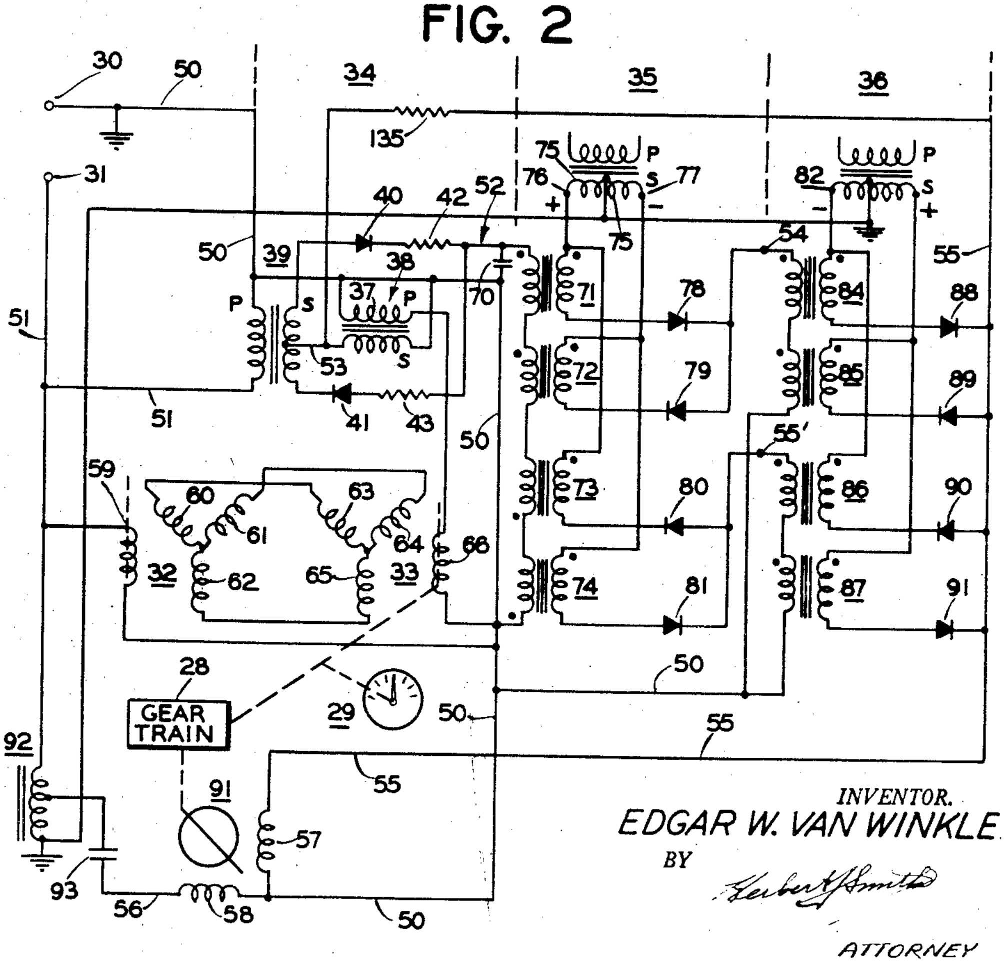

Fig. 2 shows a schematic of the arrangement shown in Fig. 1, with the supply voltage being fed into a pair of terminals 30 and 31 to feed the conductors 50, which is common ground, and 51. The supply voltage is connected to rotor winding 59 of the inductive transmitter 32. A positional movement of the shaft of transmitter 32 creates an error voltage or signal which is fed from windings 60, 61, and 62 into the inductive device or receiver 33 having windings 63, 64, and 65, said devices being of conventional design. The output winding 66 of receiver 33 is connected to the input of a three-stage amplifier which consists of a demodulator 34 feeding a direct current magnetic amplifier 35, which in turn feeds an alternating current magnetic amplifier 36. The error signal from receiver rotor winding 66 which feeds into the amplifier is connected to winding 37 of transformer 38 of the demodulator. Transformer 38 serves to provide a required high input impedance to the amplifier. The output of transformer 38 has one side of its secondary winding connected to the ground, or conductor 50, while the other side of the transformer is connected to the center of transformer 39 secondary. The primary of transformer 39 is supplied by the power from input terminals 30 and 31 via conductors 50 and 51. The secondary of transformer 39 is connected to two rectifiers 40 and 41 in phase opposition. The other side of these rectifiers are connected to two balancing resistors 42 and 43 respectively. The common point 52 of these two resistors 42 and 43 is one side of the output of this demodulator. A capacitor 70 is connected across the demodulator output to eliminate the alternating current component of the direct current signal that is produced by this demodulator. With no signal across transformer 38, the excitation of transformer 39 causes current to flow through rectifier 40, resistor 42, resistor 43, rectifier 41, and back to the other side of the secondary of transformer 39. The voltage across the common point of resistors 42 and 43, and conductor 50 or ground is equal to the voltage across the mid-point 53 of the secondary of transformer 39 and ground. Thus, there is no voltage across the output of the demodulator at a no signal condition. The voltage or signal applied to transformer 38 will cause the demodulator to unbalance, so that current will flow from one end of the secondary of transformer 39 through rectifier 40, resistor 42, through the outputs which are the four serially connected control windings of the direct current magnetic amplifier, and then back to conductor 50, through the secondary of transformer 38 to the mid-point 53 of secondary of transformer 39. A signal of opposite polarity applied to transformer 38 would cause an output signal of opposite polarity to flow through the output of this circuit via resistor 43 and rectifier 41.

The output of the demodulator circuit feeds the control windings of the direct current magnetic amplifier, consisting of four elements each having a core and two windings, namely, a control winding and a power winding. The control windings in the direct current magnetic amplifier circuit are serially connected, and the power windings are connected in pairs, one terminal of each pair being connected to opposite sides of the supply transformer secondary 75, at terminals 76 and 77. The opposite sides of the power windings of 71 and 72 are connected, respectively, to one side of rectifiers 78 and 79 in phase opposition, and with the opposite sides thereby being connected to a conductor terminal 54. The remaining sides of output windings 73 and 74 are connected, respectively, to rectifiers 80 and 81, with conductors connected at a common point at terminal 55' forming a second output circuit. The output circuit at terminals 54 and 55' provides the input to the next stage of the amplifier which is an alternating current magnetic amplifier 36 having four elements 84, 85, 86, and 87, each with a core and two windings. The power supply for the alternating current magnetic amplifier stage is from the secondary 82 of a transformer. The polarity of secondary 82 must be as shown on the drawings with reference to transformer secondary 75. Output terminal 54 is connected to inputs of the serially connected control windings of elements 84 and 85. Output terminal 55' is connected to inputs of the serially connected control windings of elements 86 and 87. The opposite sides of said serially connected control windings are connected to the common conductor 50. The power windings of elements 84 and 86 are connected to one phase of the supply transformer 82, and, respectively, to rectifiers 88 and 90 of opposite polarity, and whose conductor 55 is connected to the load winding 57 which is one phase of motor 91. The output windings of elements 85 and 87 are connected to the opposite phase of supply transformer 82 and to rectifiers 89 and 91 of opposite phase, whose outputs are also connected through conductor 55 to the variable phase winding 57 of motor 91.

A feedback circuit is connected from conductor 55 to the mid-tap 53 of transformer 39 by way of a dropping resistor 135 to provide the desired amount of feedback for the particular arrangement.

The input through conductor 51 is also connected to a transformer 92. A tap on transformer 92 is connected to a phase shifting capacitor 93, via conductor 56 to the fixed phase 58 of the motor 91.

A positive voltage at common point 52 from the demodulator output will cause current to flow from terminal 76 through the output of control winding of element 71, through rectifier 78 to terminal 54 for one-half cycle. In the other half cycle current will flow from conductor 50 through the serially connected control windings of elements 87 and 86 and thence through rectifier 80 and power winding of element 73 to one side of secondary transformer 75.

During the first half cycle the current direction from the direct current magnetic amplifier stage at terminal 54 is through the control winding of element 84 and then to the control winding of element 85, back to the common conductor 50. The direction of current flow in the power winding of element 84 is from conductor 55 through the reverse direction of rectifier 88 through the power winding of element 84 and back to the transformer 82. The current in the control winding is thus of the opposite polarity to the current in the power winding of element 84. The fluxes generated by each winding current are thus opposed and this opposition prevents a large change of flux from taking place. The current in the power winding of element 85 is of the opposite direction to that of the power winding of element 84. Thus the current in the control winding and the current in the power winding of element 85 have the same polarity, so that the fluxes generated by these currents are additive and a large change of flux occurs. As a result of this action, on the next half cycle voltage from transformer 82 will cause current to flow through the power winding of element 84 and quickly raise the flux to the saturation level. At this time the voltage across the power winding of element 84 will drop to a very low value and this voltage will then appear across the variable phase winding 57 of the two-phase motor 91. Due to the large flux change that occurs in the core of element 85, a large voltage can be sustained across the power winding of this element during the entire half cycle, and very little current will flow through this element. As a result, we have an action similar to a short circuit of the output winding of element 84, and an open circuit condition in the output winding of element 85. During this same time the voltage from the transformer element 82 is of such a direction as to tend to flow in the reverse direction through rectifiers 90 and 91, so that very little current flows through elements 86 and 87 during this same time.

During the other half cycle of this entire operation, current now flows from common conductor 50, through the control winding of element 87 and the control winding of element 86, through rectifier 80, and through the power winding of element 73. During the same time, the voltage from transformer 82 will tend to induce the flow of current through the power winding of element 86, through the reverse direction of rectifier 90, through the reverse direction of rectifier 91, through the power winding of element 87, and back to the transformer 82. The currents in the control and power windings of element 86 thus have the opposite polarity, while the currents in the control and power windings of element 87 have the same polarity. Similar to the action in the core of element 84, the flux in the core of element 86 will not change appreciably, while the flux in the core of element 87 will have a large change. Also, in a similar manner on the next half cycle, the core of element 86 will saturate and the core of element 87 will not saturate, and thus will present practically an open circuit condition.

Thus, also in a similar manner, on the same half cycle, a large current will flow from the common conductor 50, through the variable phase winding 57 of the two-phase motor 91, through conductor 55, through rectifier 90, power winding 86, and back to the transformer. Due to the fact that the power winding of element 87 is effectively an open circuit, at this time very little current will flow through the power winding of said element 87.

As a result of this action, a direct current signal of positive polarity at terminal 52 will cause an alternating current to flow through the variable phase winding 57 of motor 91.

A direct current signal of negative polarity at point 52 with respect to conductor 50 will generate a voltage of opposite phase in the power windings of elements 72 and 74. These voltages will cause current of opposite polarity at points 54 and 55, which will generate through the output windings of elements 85 and 87, an alternating current voltage wave of opposite polarity to that generated by a positive voltage, at point 52 with respect to common conductor 50, so that a direct current signal of negative polarity at point 52 with respect to common conductor 50 will cause an alternating current of opposite polarity to flow through the variable phase winding 57 of motor 91 to that generated by a direct current signal of positive polarity at point 52 with respect to common conductor 50.

Excitation power is supplied to transmitter 32 from a source connected to flow from terminals 30 and 31 through conductors 50 and 51 to the input winding 59 of transmitter 32. Mechanical rotation of the shaft of transmitter 32 induces an output voltage in the windings 60, 61, and 62 of this unit in the conventional manner. These voltages are applied to the input of receiver 33 and cause an output across winding 66 which has a phase and amplitude proportional to the positional rotation of the shaft of winding 59.

The error signal is applied to the input of the demodulator section 84 of the amplifier 21. The output of the demodulator section is a direct current voltage whose amplitude and polarity correspond to that of the error signal which is impressed on the winding 37 of transformer 38 from the rotor winding 66. The output of the direct current magnetic amplifier at terminal 54 is a half wave signal whose amplitude and phase correspond to half of the error signal. The magnitude and phase of the voltage at point 55 relative to that of common conductor 50 is a half wave signal which corresponds to the other half of the error signal. The output of the alternating current magnetic amplifier on conductor 55 relative to ground, is an alternating current signal of amplified value and of opposite polarity to the error signal at point 53. The signal impressed on conductor 55 is applied to winding 57 of motor 91 and causes the motor to revolve and turn the connected gear train 94 which causes the shaft and winding 66 of receiver 33 to revolve in such a manner as to reduce the voltage across winding 66 to zero; so that the shaft position of rotor winding 66 is then in null position and agrees with the shaft position of rotor winding 59 of transmitter 32.

In the alternating current magnetic amplifier of the present invention, the current in the control winding creates a flux which aids or opposes the flux induced in the core by the leakage current in the reverse half cycle of operation. If the flux created by the control winding aids, the flux change will be great, and if it opposes, the flux change will be small. In the latter condition, the core will saturate early in the next half cycle, and in the former case, the core will saturate later in the next half cycle. Saturation of the core earlier will advance the time at which output current occurs, and saturation later will delay the time so that if two cores such as in element 84 and 86 are connected in a balanced condition, as shown in Fig. 3, advancing the saturation time will, due to the method of connection, retard the time of firing of the core of element 86. This produces an output voltage from element 84 that is not balanced by an output voltage from element 86, and thus the output voltage resultant therefrom will appear across load terminals 102 and 103.

Since the output windings of elements 84 and 86 are normally in a balanced condition, no voltage appears across the control windings of elements 84 and 86. It is solely the control current generating a flux that determines the flux change in the cores of these two elements. Therefore, since there is no control winding voltage to aid or oppose an externally applied control voltage, the method of operation cannot be by having the externally applied voltage aid or oppose the voltage induced therein by the flux due to the power windings of elements 84 and 86. The phase of the frequency of the control winding energy must be almost in phase or 180° out of phase with that of the power winding and of the same frequency for the type signal used in the servo system.

Four variations of the alternating current magnetic amplifier are shown in Figs. 3, 4, 5 and 6 of the drawings. In the four views reference is given to parts which are similar to those shown in the alternating current magnetic amplifier stage of the circuit shown in Fig. 2. In all four views the transformer secondary 82 is shown connected to the power windings of elements 84, 85, 86 and 87, with the rectifiers 88, 89, 90 and 91, each having one side thereof, respectively, connected to its power winding and with outputs connected to their respective loads.

In Fig. 3 terminals 100 and 101 are supplied with an alternating current input and with a load connected across terminals 102 and 103. In this view, the control windings are connected in series aiding and with the load connected between the terminal 103, which is common to the four rectifiers, and terminal 102, which is connected to the mid-tap 104 of the secondary winding 82 of the transformer.

Figure 4:
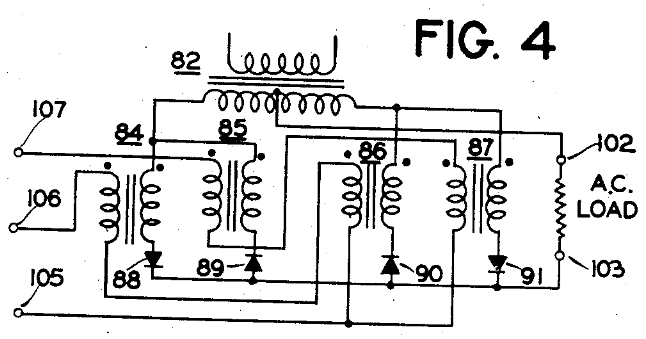
Fig. 4 is a modification of Fig. 3 with the control windings connected in parallel series.
Figure 5:
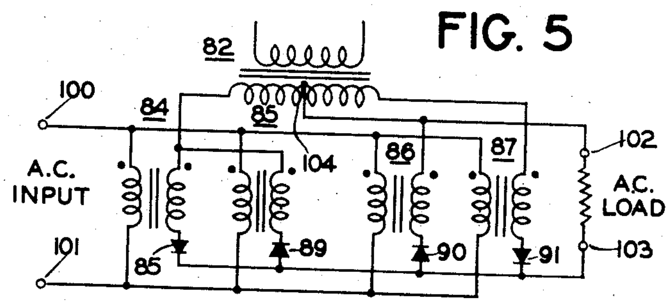
Fig. 5 is another modification of Fig. 3 with the control windings connected in parallel.

The power windings of Figs. 4 and 5 are connected in a manner similar to that shown in Fig. 3. In Fig. 4 there are three input terminals, 105, 106 and 107, and with the control windings connected in parallel series, the control windings of elements 84 and 86 being connected in series, and the control windings of elements 85 and 87 also being connected in series. One side of the control windings for elements 84 and 86 are connected to terminal 106, while one side of control windings for elements 85 and 87 are also connected in series with one side being connected to terminal 107. The opposite ends of said series connections are in common with the input terminal 105. The three-terminal input may be used for alternating current or direct current operation, being connected from a preceding stage having a network with a three-terminal output, such, for example, as shown in the alternating current magnetic amplifier stage of Fig. 2.

The input terminals of Fig. 4, at any instant, for direct current operation, should have terminals 106 and 107 of opposite polarity with respect to the reference terminal 105. For alternating current input, terminals 106 and 107 may be electrically connected together, or strapped, to form a common terminal which may be used as one side of the alternating current input circuit, and with terminal 105 as the other side of the input.

The control windings in Fig. 4 are shown connected in parallel series and the alternating current load, as indicated by legend on the drawings, is connected across terminals 102 and 103.

In Fig. 5 terminals 100 and 101 are the input terminals connected to the control windings which are all connected in parallel.

Figure 6:
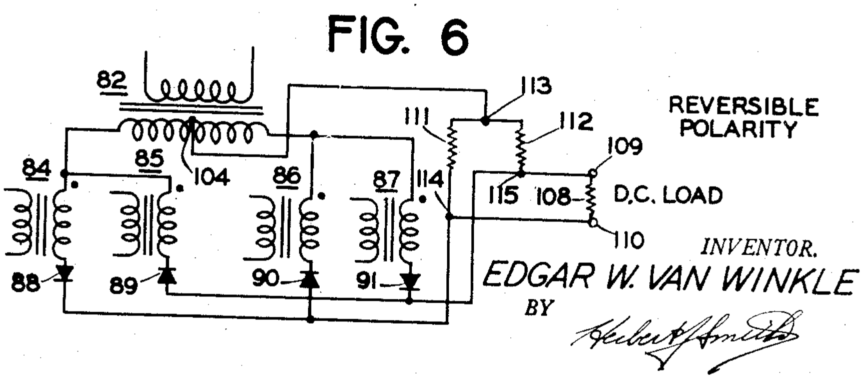
Fig. 6 is a further modification of Fig. 3 with the output windings connected for a reversible polarity direct current output.

Fig. 6 shows the four elements of the alternating current magnetic amplifier having the power windings thereof connected to provide reversible polarity for a direct current load which is represented by resistor 108 connected across terminals 109 and 110. The load 108 is connected across a resistence network, including resistors 111 and 112, each of which has one side connected to a common mid-point or terminal 113, with said terminal being connected to the midtap 104 of the secondary 82 of the transformer. The opposite side of resistor 111 is connected to one side of rectifiers 88 and 90, while the opposite side of resistor 112 is connected to one side of rectifiers 89 and 91. The control windings of the elements 84, 85, 86 and 87 are shown, but they are not connected to any input source since any of the arrangements shown in the other views may be used.

When the direction of current flow in Fig. 6 in one direction is from terminal 104 to terminal 113, it will also flow through resistor 111 and thence via the terminals 114 and 110 to the load 108. When the current flow is in the opposite direction, current flow will be from terminal 114 to terminal 110, through the load 108, to terminal 115, through resistor 112 and via terminal 113 to the terminal 104 of the secondary 82 of the transformer.

The magnetic amplifier 36 has three stages comprising a demodulator stage, a direct current magnetic amplifier stage, and an alternating current magnetic amplifier stage, with the demodulator stage having an alternating current input and a direct current output. The direct current magnetic amplifier stage has a direct current input received from the demodulator, and an alternating current output. The alternating current stage of the magnetic amplifier has an alternating current input, received from the output of the direct current magnetic amplifier, and an alternating current output. The overall amplifier has an alternating current input and an amplified alternating current output.

Figs. 7 to 12 inclusive show waveforms for the alternating current magnetic amplifier stage of the amplifier 36.

Figs. 7 through 10A pertain to the alternating current magnetic amplifier stage and show current and voltage waveforms of the input and output of the stage of Fig. 3.

Figs. 7 and 7A show the current input waveform in the control windings. Fig. 7 is substantially of effectively zero to produce the output current waveforms shown in Fig. 8 with said substantially zero control voltage of the four elements 84, 85, 86 and 87.

Fig. 9 shows the output current waveforms with the control voltage as shown in Fig. 7A applied for the maximum output voltage of the four elements 84, 85, 86 and 87.

Figs. 10 and 10A show the output vector sum of currents from the four elements whose waveforms are shown in Figs. 8 and 9 respectively.

Fig. 11 shows the waveforms of the input voltage across the control windings which produce current in phase therewith as shown by the waveform in Fig. 11A.

Fig. 12 is a composite view showing the waveforms with no-load and full-load currents in an element as shown by an oscilloscope using constant scale settings and external synchronization. This view shows the manner in which the output element current is changed by applying an alternating current to the control element. The two views show that control current advances the time of saturation of the core.

A three-stage full wave suppressed carrier magnetic amplifier is shown in Fig. 13. The input stage 120 has its output connected to the input of intermediate stage 121, which in turn has its output connected to the input of the output stage 122. Each stage is fundamentally connected like that shown in Fig. 3. In Fig. 13 the excitation for the input stage is provided by secondary winding 123, and the winding 124 supplies excitation for the second stage. The voltages for the first and second stages are the same. The output stage or stage 3 has a winding 134 which supplies the excitation for this stage with the voltage thereof being appreciably higher than the excitation voltage of the other two stages. Each of the three stages has windings and highly permeable cores forming similar elements 84, 85, 86 and 87 with corresponding rectifiers 88, 89, 90 and 91. Variable potentiometers 125 and 126 are connected across rectifier elements 89 and 90, and 88 and 91, respectively, with variable taps therefrom being connected in common with a terminal 127, which is connected in turn to a common conductor 128 or ground at terminal 130. The variable potentiometers 125 and 126 are the initial adjustment connections to the outputs of the first stage of the cascaded amplifier for electrically balancing said last stage output to zero when said first stage input is zero. The input for the three-stage magnetic amplifier is connected across terminals 129 and 130, while the output of the three stages is represented by a load resistor 133 connected across terminals 131 and 132. To employ the three-stage alternating current magnetic amplifier as shown in Fig. 13, with the circuit of Fig. 2, terminal 131 would be connected to one end of the variable phase winding 57 (Fig. 2), with the opposite end of said variable phase winding of the motor 91 being connected to ground, such as by being connected to terminal 132 (Fig. 13).

The output waveform of each stage of the three-stage full wave magnetic amplifier is similar to the waveform of the input of the respective stages, so that cascading of many stages may be employed. Direct current magnetic amplifiers cannot be cascaded without a translation means. By employing the arrangements shown herein, many individual stages may be employed to provide the desired degree of amplification. The rectifiers throughout the application are of the dry type, such as selenium rectifiers. However, any suitable rectifiers may be employed.

The cascading arrangement of many stages of amplification permits high gain with good frequency characteristics since the various stages have similar alternating current waveforms.

From the foregoing it will be seen that a full wave output is obtainable which would have a low harmonic content which provides a high torque output usable with a servomotor. Further, the phase of the signal across the load with respect to the excitation phase is phase reversible with substantially constant gain. Moreover, the apparatus is easily adapted to mass production without costly testing and adjustment procedures.

The position servo system shown herein is for a specific system, but it is clear that transmitter-receiver inductive devices may have the transmitter actuated by any number of other devices, such as repeaters for compass systems, and the receiver may have its generated signal amplified by the magnetic amplifier means presented herein to provide the power to operate a variable phase motor to restore the receiver to null.

In Figs. 2, 3, 4, 5, 6 and 13, the manner of winding the coils is shown by the conventional dot system, wherein the start and finish of the respective coils is shown by a dot, and the absence of a dot, respectively, for the individual coils. For example, each of the windings of the magnetic amplifier elements is shown with a dot at one end, indicating the start of the winding, and the absence of a dot at the other end of the same winding indicating the finish of the particular winding. Consequently, for the various coils, and combinations of coils, one is able to determine whether or not the particular arrangement of coils is to have said coils electrically connected series aiding or series opposition.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. A magnetic amplifier comprising four elements each having a core of highly permeable magnetic material, a control winding and a power winding, a rectifier serially connected with each of said power windings, said elements being arranged in pairs with the serially connected power windings and rectifiers of each pair being connected in parallel circuit with the rectifiers connected in phase opposition, a center tapped alternating power source, a corresponding end of each of said parallel circuits being connected to a respective side of said power source, and output terminals connected to the center tap of said power source, the other side of said parallel circuits and one control winding of each pair of elements being connected in series for connection across one side of a source of center tapped alternating control potential and the other winding of each pair of elements being connected in series for connection across the other side of said control potential source.

2. A magnetic amplifier comprising four elements, each having a core of highly permeable magnetic material, a control winding and a power winding, a three-terminal source of alternating current excitation, the control windings being connected in parallel series across said source, a rectifier serially connected with each of said power windings, said power windings and rectifiers being connected in parallel pairs with the rectifiers of each of said parallel pairs being connected in phase opposition, an input and an output for each of said parallel pairs, a source of alternating current excitation with a mid-tap and a pair of oppositely polarized end terminals, each of said end terminals being connected to a corresponding end of a respectively associated one of said parallel pairs, and load terminals operatively connected to the outputs of said parallel pairs and said mid-tap to provide full wave phase reversible outputs at said load terminals.

3. A magnetic amplifier comprising first and second stages, each including four amplifier elements comprising a control winding and a power winding and a rectifier serially connected with the power winding, said elements being arranged in pairs with the serially connected power windings of each pair being connected in parallel circuit and with the rectifiers connected in phase opposition, a center tapped alternating power source, a corresponding end of each of said parallel circuits being connected to a respective side of said power source, a pair of output terminals, the other end of each parallel circuit of the first stage being connected to one terminal of said pair of output terminals through the series combination of one control winding of each pair of the elements of the second stage, the other end of each parallel circuit of the second stage being connected to the other terminal of said pair of output terminals, a pair of input terminals, and means connecting the control windings of the first stage in series across said input terminals.

References Cited in the file of this patent

UNITED STATES PATENTS

| | | |
|---|---|---|
| 2,450,084 | Emerson | Sept. 28, 1948 |
| 2,477,729 | Fitzgerald | Aug. 2, 1949 |
| 2,555,992 | Ogle | June 5, 1951 |
| 2,764,719 | Woodson | Sept. 25, 1956 |
| 2,768,345 | Ogle et al. | Oct. 23, 1956 |
| 2,774,022 | Malick | Dec. 11, 1956 |
| 2,775,724 | Clark | Dec. 25, 1956 |

OTHER REFERENCES

Publication: "An Improved Magnetic Servo Amplifier," Lufcy et al., AIEE, Transactions, vol. 71, part I, September 1952, pp. 281–283.